United States Patent
Siemens et al.

(10) Patent No.: US 11,770,338 B2
(45) Date of Patent: Sep. 26, 2023

(54) INCREASING MULTI-PATH SIZE USING HIERARCHICAL FORWARDING EQUIVALENT CLASSES

(71) Applicant: Arista Networks, Inc., Santa Clara, CA (US)

(72) Inventors: Trevor Siemens, Coquitlam (CA); Mayukh Saubhasik, Richmond (CA); Vahab Akbarzadeh, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/410,194

(22) Filed: Aug. 24, 2021

(65) Prior Publication Data
US 2022/0239595 A1     Jul. 28, 2022

Related U.S. Application Data

(60) Provisional application No. 63/142,793, filed on Jan. 28, 2021.

(51) Int. Cl.
*H04L 47/12*     (2022.01)
*H04L 45/00*     (2022.01)

(52) U.S. Cl.
CPC .............. *H04L 47/12* (2013.01); *H04L 45/22* (2013.01)

(58) Field of Classification Search
CPC ................................. H04L 47/12; H04L 45/22
See application file for complete search history.

(56) References Cited

U.S. PATENT DOCUMENTS

| | | | |
|---|---|---|---|
| 8,059,658 B1 * | 11/2011 | Rovner | H04L 45/74591 370/395.31 |
| 10,263,890 B2 * | 4/2019 | Bannister | H04L 45/20 |
| 11,303,556 B2 * | 4/2022 | Bamford | H04L 45/38 |
| 2022/0210072 A1 * | 6/2022 | Dutta | H04L 47/125 |

\* cited by examiner

*Primary Examiner* — Donald L Mills
(74) *Attorney, Agent, or Firm* — Fountainhead Law Group P.C.

(57) ABSTRACT

Techniques for operating a network device for increasing the logical multi-path size of a hardware forwarding table are provided. In some embodiments, the network device may determine that a number of data points in a first node is greater than a maximum node capacity; generate second nodes; update the first node to refer to the second nodes; distribute the data points among the second nodes; and program a hardware table with the updated first node and the second nodes.

20 Claims, 12 Drawing Sheets

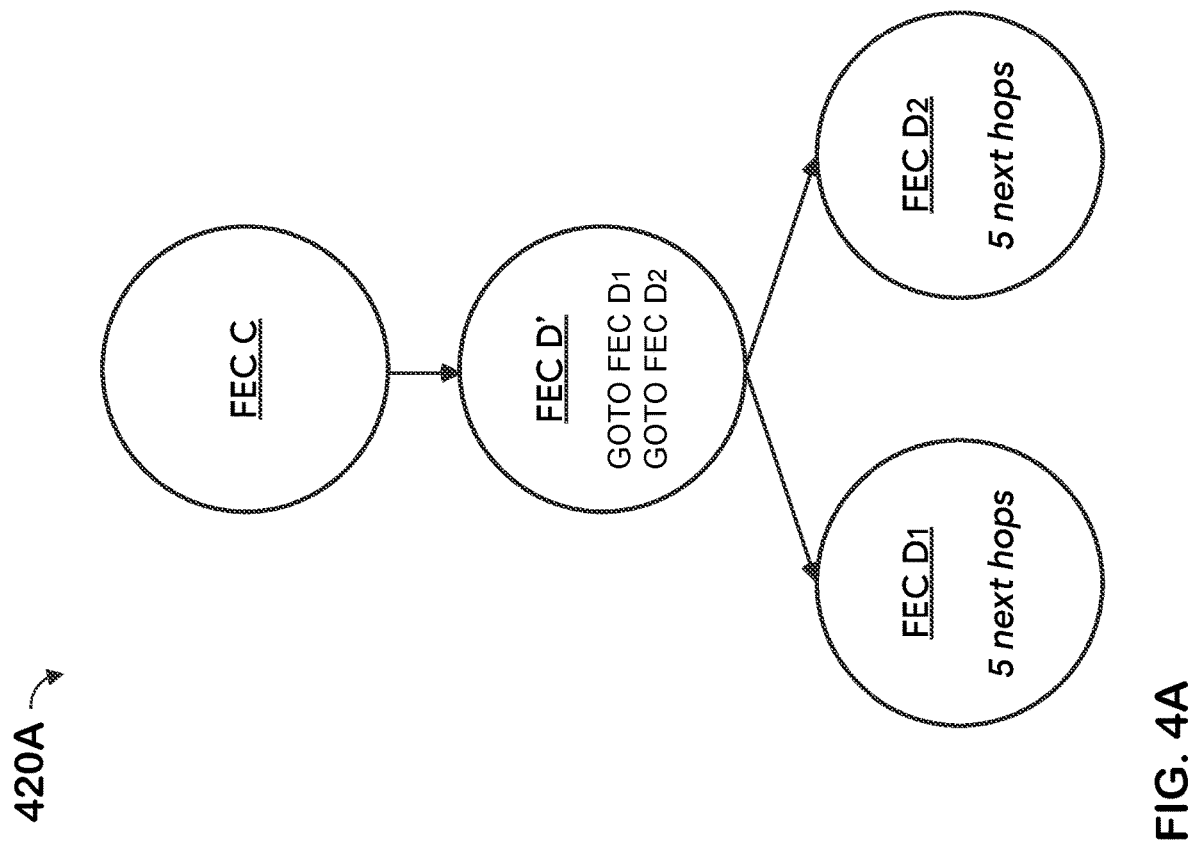
FIG. 4A
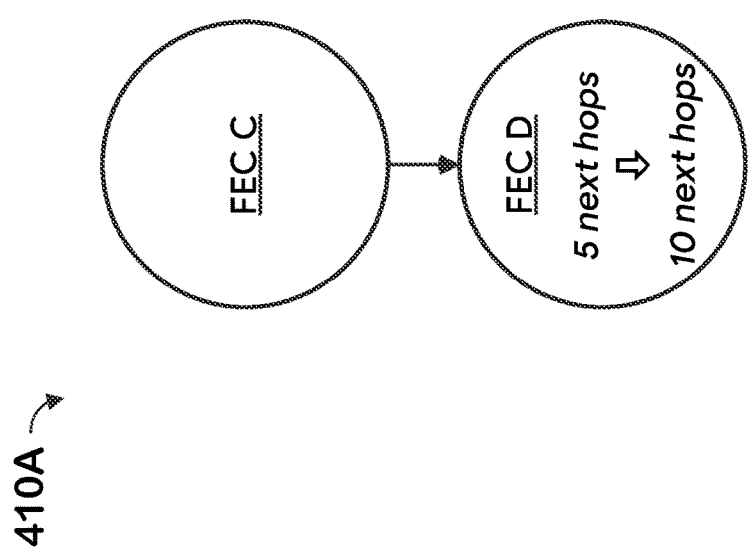

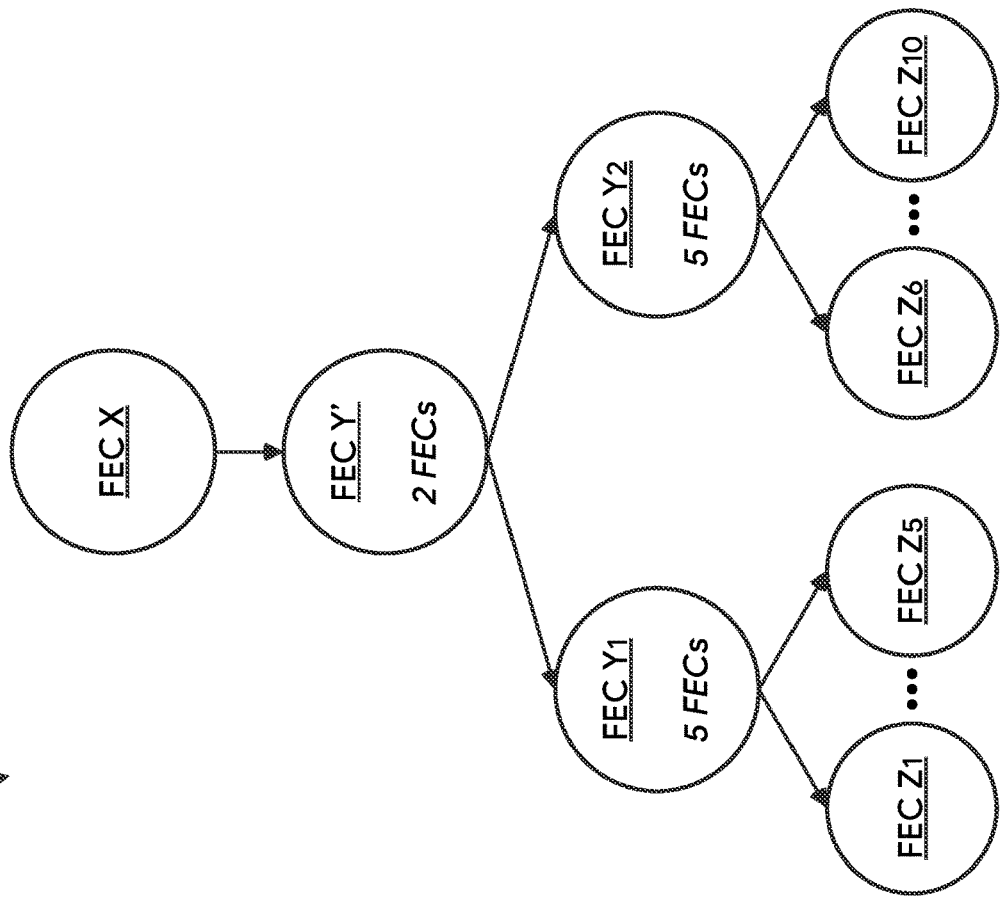
FIG. 4B
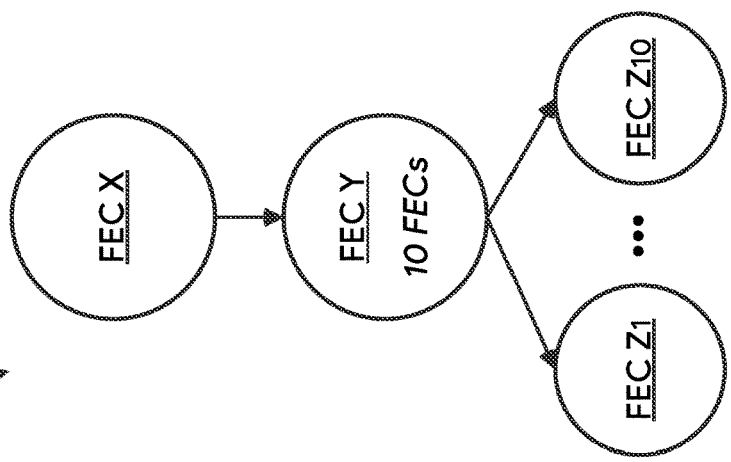

INCREASING MULTI-PATH SIZE USING HIERARCHICAL FORWARDING EQUIVALENT CLASSES

CROSS-REFERENCE TO RELATED APPLICATIONS

This application claims the benefit of U.S. Provisional Application No. 63/142,793, filed Jan. 28, 2021, which is incorporated by reference in its entirety herein for all purposes.

BACKGROUND

Packet forwarding in a network device involves the determination of a next hop device for a received data packet. The network device transmits the data packet to the next hop device and the next hop device forwards the packet on to its destination in the network. Packet forwarding may use statistically or dynamically obtained forwarding information to prepare the received packet for transmission to the next hop device. These updates are received in the control plane of the switch and maintained in a forwarding table also in the control plane. A program running in the control plane—using the forwarding table in the control plane—updates a forwarding table in the data plane, which is sometimes referred to as the forwarding information base (FIB). The control plane may be said to update the FIB and the data plane to read or consume the FIB.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 4A and 4B illustrate example HFEC expansions, in accordance with some embodiments of the disclosure.

DETAILED DESCRIPTION

Overview

Figure 1A:
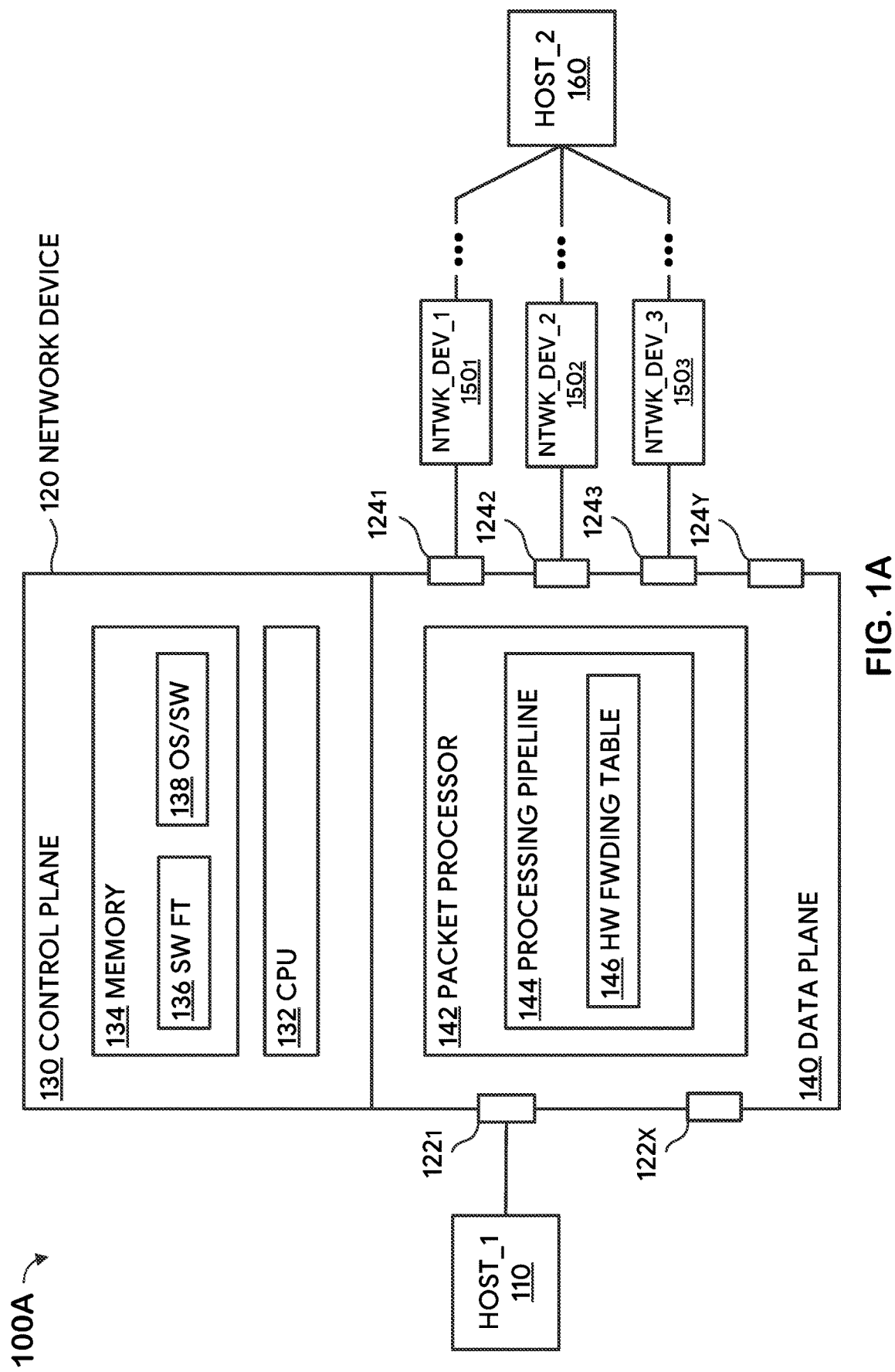
FIG. 1A illustrates a system architecture, in accordance with some embodiments of the disclosure.

The present disclosure describes systems and techniques for operating a network device (e.g., switch, router, and the like) to increase maximum logical multi-path size using hierarchical forwarding equivalence classes (FECs) in a hardware forwarding table. The number of next hops that can be programmed in a forwarding equivalence class (FEC) in a hardware forwarding table of a network device (e.g., a packet processor in a switch) is finite. When the maximum capacity is reached, additional next hops cannot be added without deleting existing next hops.

A FEC describes a set of packets with similar or identical characteristics which may be forwarded in the same way. After analyzing a packet header, the packet may be forwarded according to a FEC. The FEC may direct the packet to its destination through a number of next hops using multi-path routing.

Multi-path routing, such as equal-cost multi-path (ECMP) and unequal-cost multi-path (UCMP) routing, are forwarding mechanisms for routing packets to load balance traffic and create redundancy within a network. Some ECMP and UCMP routes may have a very large number of members, for example, due to implementations of flow hashing resilience and scale of the network's paths. The maximum number of paths natively supported by a network device (e.g., switch) may be smaller than the number required by the network. For example, the number of next hops for a FEC exceeds the maximum number supported by the network device. By way of non-limiting example, the maximum number may be in a range from 128 to 1,024.

Embodiments of the present disclosure may increase the number of next hops in a multi-path route by expanding a FEC into a hierarchical FEC. The next hops may be divided into sub-groups that are of a size the switch can accommodate. A FEC at a first level (top) of hierarchy identifies FECs at a second (lower) level of hierarchy. The FECs at the second level of hierarchy are each associated with a respective one of the sub-groups. Each second level FEC identifies next hops in its sub-group.

The number of sub-groups may be determined based on the number of next hops, the maximum number of next hops supported by the hardware, a fill percentage to allow subsequent addition of next hops, and the like. The number of sub-groups may shrink to conserve hardware resources and grow to accommodate an increase in the number of next hops. Next hops may be distributed among the sub-groups to support equal and/or unequal weighting.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 7:
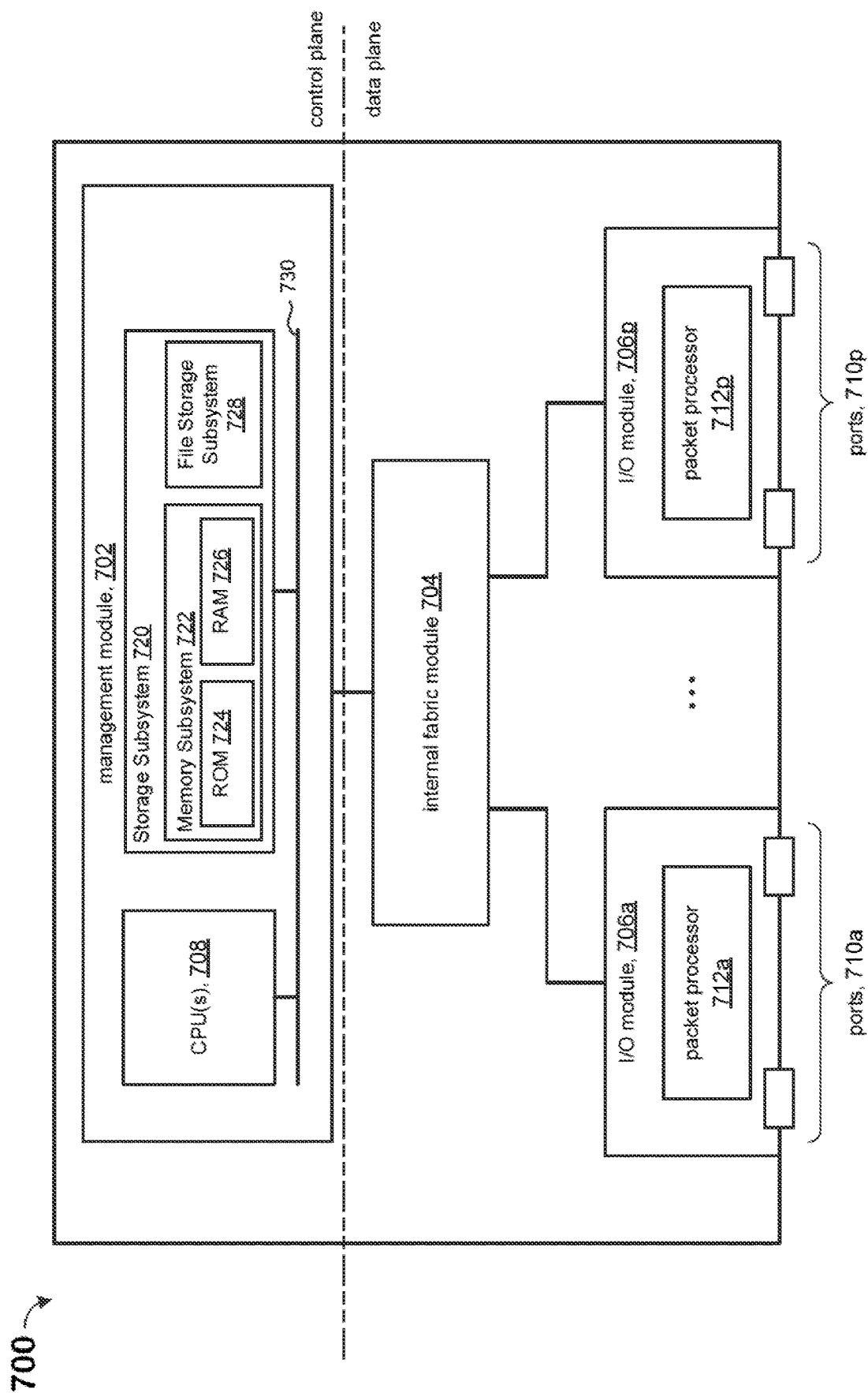
FIG. 7 illustrates a network device, in accordance with some embodiments of the disclosure.

FIG. 1A illustrates example system 100A in accordance with the present disclosure. System 100A may include host_1 110, network device 120, network_device_1 $150_1$ through network_device_3 $150_3$, and host_2 160. Host_1 110 and host_2 160 may be computing devices, such as servers, desktop computers, laptop computers, tablet computers, smartphones, and the like. Network device 120 and network_device_1 $150_1$ through network_device_3 $150_3$ may be embodiments of network device 700 (FIG. 7). Host_1 110 may communicate with network device 120 directly or through one or more intermediate network devices (not shown). Host_2 160 may communicate with network_device_1 $150_1$ through network_device_3 $150_3$ directly or through one or more intermediate network devices (not shown).

Network device 120—which may be a switch, router, and the like—includes control plane 130 and data plane 140 (sometimes referred to as a forwarding plane). Control plane 130 may exchange network topology information with other network devices and construct routing tables, such as software forwarding table 136, using a suitable routing protocol. Routing protocols may be a software mechanism by which network devices communicate and share information about the topology of the network, and the capabilities of each routing node. Routing protocols may include Enhanced Interior Gateway Routing Protocol (EIGRP), Routing Information Protocol (RIP), Open Shortest Path First (OSPF), Border Gateway Protocol (BGP), Label Distribution Protocol (LDP), and the like.

Software forwarding table 136 may be stored in memory 134. Memory 134 may be an embodiment of storage subsystem 720 (FIG. 7). Software forwarding table 136 may be a forwarding information base (FIB) (also referred to as an Internet Protocol (IP) forwarding table). For example, software forwarding table 136 may be a data structure which stores information that is used to determine where data packets traveling over an IP network will be directed. For example, software forwarding table 136 may include routing information for sending an incoming (ingress) IP data packet to the next hop on its route across the network as an outgoing (egress) IP data packet. A data packet may be a formatted unit of data carried by a data network. A data packet may include control information (e.g., one or more headers) and user data (payload).

Control plane 130 may include central processing unit (CPU) 132. Among other processes, CPU 132 may run operating system and/or software 138, which may be stored in memory 134. Operating system and/or software 138 may be at least one of an operating system and a computer program. Using the routing information stored in software forwarding table 136, operating system and/or software 138 may program forwarding tables in data plane 140, such as hardware forwarding table 146, using a software development kit (SDK), application programming interface (API), and the like.

On startup of network device 120 or when routing/topology changes occur in system 100A, CPU 132 running operating system and/or software 138 may program/update software forwarding table 136 and hardware forwarding table 146. Hardware forwarding table 146 may also be referred to as a hardware FIB or media access control address (MAC) table.

Data plane 140 may include ingress ports $122_1$-$122_X$, packet processor 142, and egress ports $124_1$-$124_Y$. Packet processor 142 may be an embodiment of packet processor 712a-712p. Packet processor 142 may include processing pipeline 144 and hardware forwarding table 146. Processing pipeline 144 may be a multi-stage pipeline to process data packets. Forwarding a data packet may involve looking at multiple header fields and each stage of processing pipeline 144 may be programmed to look at a different combination of header fields.

In operation, network device 120 may receive a data packet from host_1 110 through ingress port $122_1$ and the data packet may go to packet processor 142. In processing pipeline 144, the next hop for the data packet may be determined using hardware forwarding table 146.

Multi-Path Routing

To select among different paths or links between a source and destination, a cost or weight for each path may be calculated from various combinations and permutations of metrics. By way of example and not limitation, metrics may include: link utilization, number of hops, speed of the path, packet loss, latency, path reliability, path bandwidth, throughput, load, maximum transmission unit (MTU), administrator configured value, and the like. By way of further non-limiting example, equal-cost multi-path (ECMP) and unequal-cost multi-path (UCMP) are path selection strategies that may be used to load-balance traffic or create redundancy within a network (e.g., system 100A).

Equal-cost multi-path (ECMP) routing may be used for the route from host_1 110 to host_2 160. In ECMP, traffic of the same session or flow—in other words, traffic with the same source and destination—may be transmitted across multiple paths of equal cost. Paths of equal cost may be identified based on routing metric calculations and hash algorithms. In this way, traffic may be load balanced and bandwidth increased. The ECMP process may identify a set of next hops for network device 120. For example, network_device_1 $150_1$, network_device_2 $150_2$, and network_device_3 $150_3$ may be equal-cost next hops toward the destination, host_2 160.

Unequal-cost multi-path (UCMP) may alternatively or additionally be used for the route from host 1 100 to host 2 160. In UCMP, the multiple paths for traffic with the same source and destination have different (e.g., unequal) costs. The cost of each path may be determined using routing metric calculations. Typically, the path having the lowest cost may be used as a primary path. The performance of routing to a given destination may be improved (e.g., load balanced and bandwidth increased) by using the higher-cost routes to augment the primary route.

Traffic across paths of unequal cost may be distributed among each of the possible paths in proportion to their relative costs. For example, if the cost of a primary path were half the value of its alternative, then the primary path may be used twice as often as the alternative. The UCMP process may identify a set of next hops for network device 120. For example, network_device_1 $150_1$, network_device_2 $150_2$, and network_device_3 $150_3$ may be unequal-cost next hops toward the destination, host_2 160.

Because they may address just the next hop destination, ECMP and UCMP may be used with different routing protocols. Although ECMP and UCMP are described in the following illustrative examples, it will be appreciated that the present disclosure is not specific to ECMP and UCMP routes, and is applicable to other strategies.

Figure 1B:
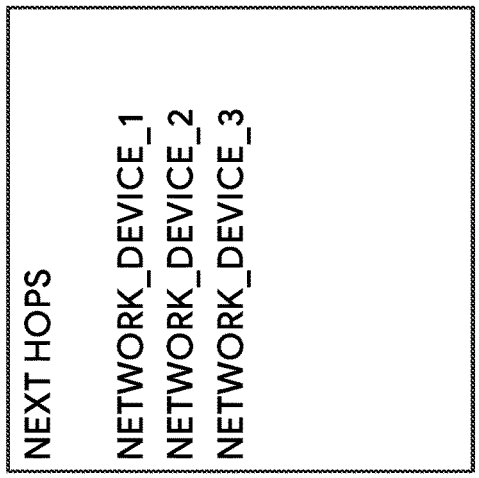
FIG. 1B illustrates example next hops, in accordance with some embodiments of the disclosure.

In FIG. 1B, set of multi-path next hops 100E include network_device_1 ($150_1$), network_device_2 ($150_2$), and network_device_3 ($150_3$). In this example, the ECMP or UCMP path is from host_1 110 to host_2 160. The costs for UCMP next hops are not shown. Although three next hops are illustrated, fewer or more next hops may be used.

Each set of next hops (e.g., next hops 100B) may be stored in hardware forwarding table 146 as a Forward Equivalence Class (FEC) object. In addition to the next hops, a FEC object may also store forwarding information for the route, such as what egress links the next hop uses, next hop IP addresses, other identifying information for the next hops, and the like. Packet processor 142 may use FEC objects to make forwarding decisions for a packet that is meant for a certain route. FEC objects may be referred to herein simply as a FEC or FECs. Hardware forwarding table 146 may have a hardware limit for (e.g., maximum number of) the number of FECs it may hold or store.

Graph

Figure 2:
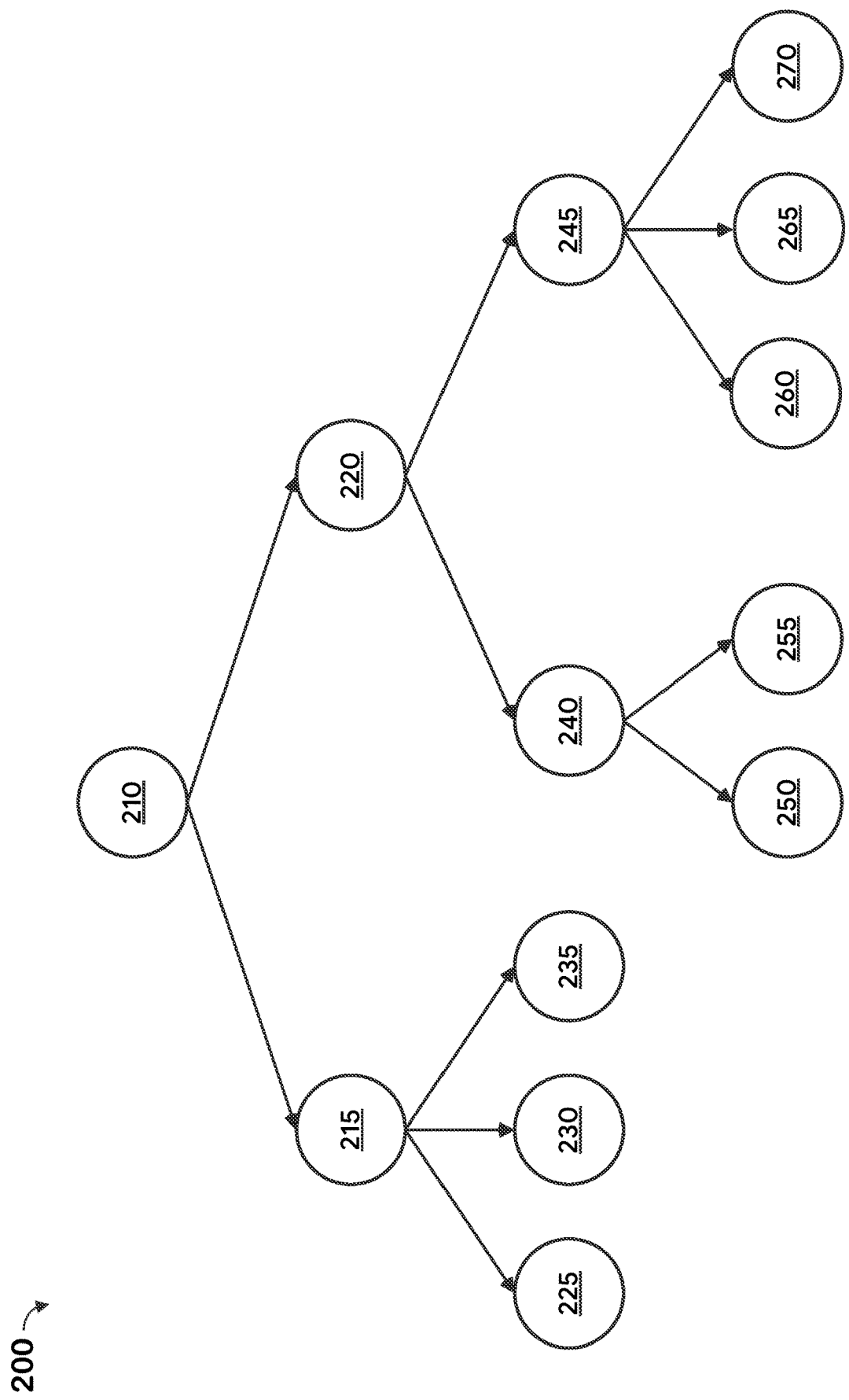
FIG. 2 illustrates an example graph, in accordance with some embodiments of the disclosure.

FIG. 2 illustrates graph 200 that can be used to represent hierarchical FECs, in accordance with some embodiments. Graph 200 may also be referred to as a tree or hierarchy. Graph 200 may comprise nodes 210, 215, 220, 225, 230, 235, 240, 245, 250, 255, 260, 265, 270. Each node may store a rule (e.g., a FEC) for how to route a packet. A rule may refer to another rule (which reflects the hierarchical nature of hierarchical FECs), select another rule from among multiple other rules, indicate a next hop, and the like.

Typically, a graph may be "entered" at a root node (e.g., root node 210) and "exited" at a leaf node (e.g., leaf nodes 250, 255, 260, 265, 270). A root node may be a node that is referenced by a route entry (e.g., an IP route, MPLS route, and the like based on a data packet header). Each node may have any number of child nodes. A child node is a sub-node of a given node. For example, nodes 215 and 220 are child nodes of root node 210, nodes 225, 230, 235 are child nodes of node 215, nodes 240 and 245 are child nodes of node 220, and so on.

As shown in FIG. 2, root node 210 may be said to be at the "top" and leaf nodes 240, 245, 250, 255, 260, 265, 270 at the "bottom" of the tree, graph, or hierarchy. Nodes 215 and 220 may be said to be "above" or "higher" (e.g., at a higher level of the hierarchy) than nodes 225, 230, 235, 240, 245. Nodes 225, 230, 235, 240, 245 may be said to be "below" or "lower" (e.g., at a lower level of the hierarchy) than nodes 215 and 220. And so on. When discussing node 215 relative to nodes 225, 230, 235, node 215 may be referred to as an "upper level node" and nodes 225, 230, 235 as "lower level nodes." And so on.

Hierarchical Forwarding Equivalence Classes

Figure 3A:
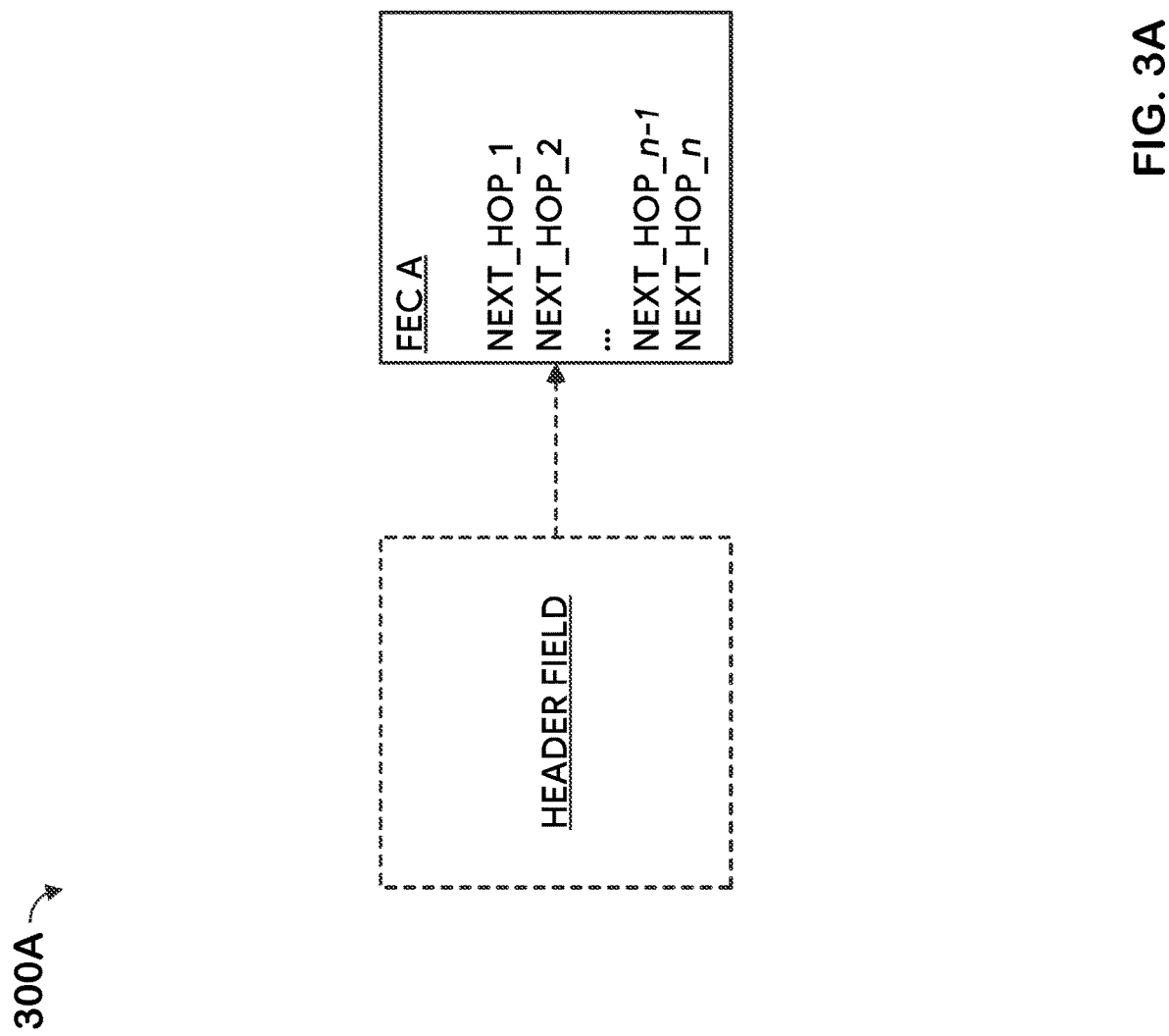
FIGS. 3A and 3B illustrate an example FEC expansion, in accordance with some embodiments of the disclosure.

FIG. 3A illustrates a simplified FEC (just the next hops are shown), FEC A, according to various embodiments. Based on header field (e.g., one or more header fields of a data packet), packet processor 142 (FIG. 1) may apply a rule (e.g., FEC A) to determine a next hop in a multi-path route for the data packet. In this example, FEC A has n next hops (e.g., next_hop_1 through next_hop_n). n may exceed a maximum number of next hops natively supported by network device 120 (e.g., forwarding plane, line cards, etc.). This may be due to flow hashing resilience, a network's path scale, and the like. Hierarchical FECs (HFECs) may be used in packet processor 142 to increase the effective maximum number of paths that can be used for a multi-path (e.g., ECMP, UCMP, and the like) route.

Figure 3B:
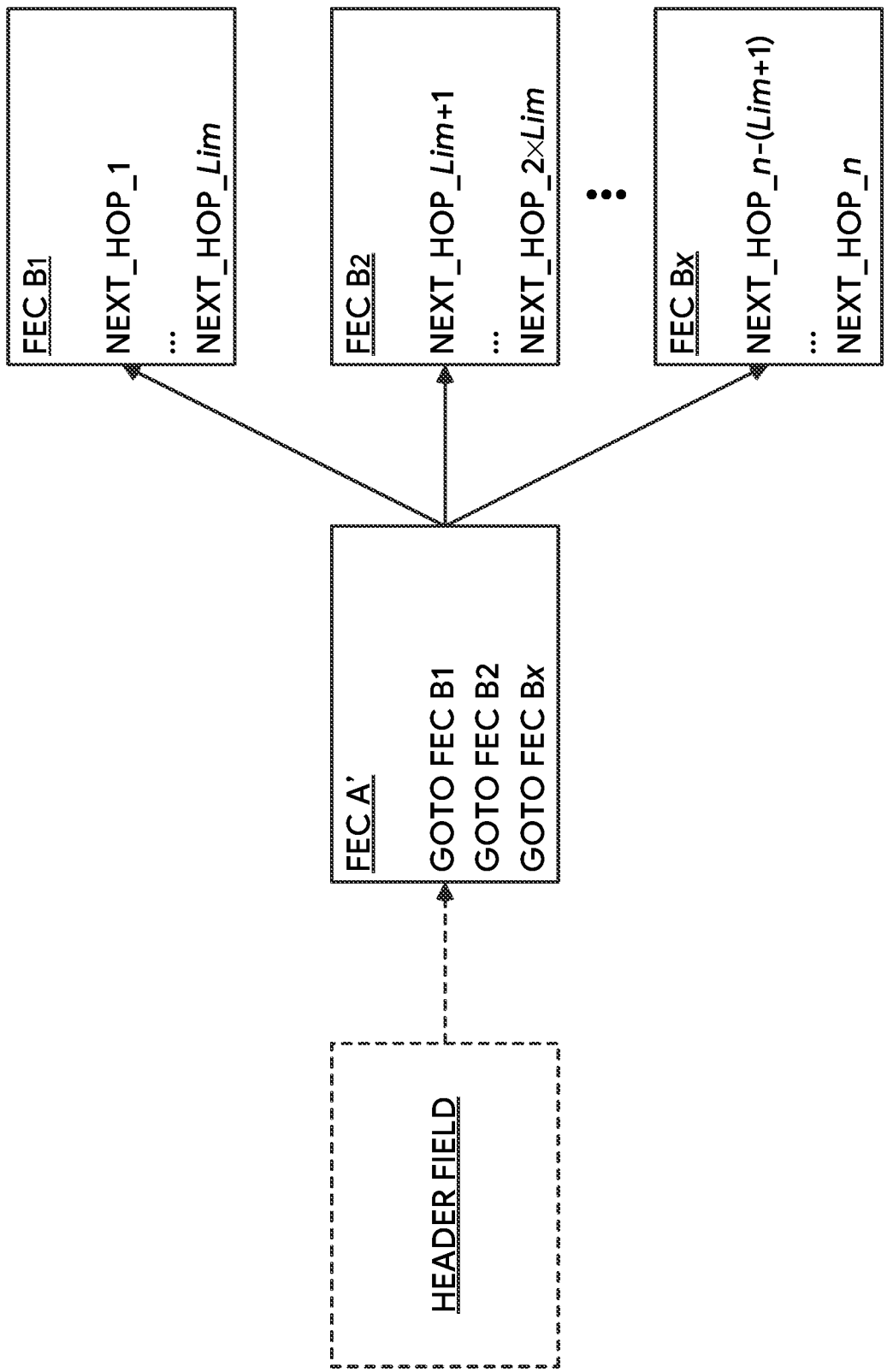

FIG. 3B depicts a simplified HFEC—FEC A' and FEC $B_1$ through FEC $B_x$—in accordance with some embodiments. Suppose n next hops are needed for a multi-path route, but packet processor 142 supports hardware limit Lim next hops, where Lim is less than n. FEC A' may refer to x child FECs, FEC $B_1$ through FEC $B_x$. Each of the child FECs may hold (store) a portion (e.g., sub-group) of the n next hops, up to its limit, Lim. As shown, FEC $B_1$ stores next_hop_1 through next_hop_Lim, FEC B2 holds next_hop_Lim+1 through next_hop_2×Lim, . . . FEC Bx holds next_hop_n– (Lim+1) through next_hop_n. The number of next hops in each FEC is less than or equal to Lim.

Although the graph is arranged horizontally, FEC A' may be a root node above child nodes FEC $B_1$ through FEC $B_x$.

FIG. 3B illustrates how unexpanded FEC A in FIG. 3A may be expanded to an HFEC to accommodate a larger number of next hops. As shown in the following examples, such an expansion may be performed at any level of hierarchy in an HFEC (e.g., represented by a graph, tree, or hierarchy) when a number of next hops in a FEC exceeds the hardware limit.

Suppose the hardware limit is 256. An artificial level of hierarchy as described herein may be introduced when a multi-path route exceeds the hardware limit of packet processor 142. The level of hierarchy may be produced when the next hops of a FEC are split across several other FECs, and pointed (referred) to by an updated top-level FEC. In this example, the number of multi-path next hops may increase from 256 to 65,636 (or $256^2$).

FIG. 4A illustrates simplified HFECs 410A and 420A, in accordance with various embodiments. FEC C in HFECs 410A and 420A may be a root node at the top of the tree, hierarchy, or graph. HFEC 410A may include FEC C and FEC D. There may be additional FECs below FEC C (not shown).

Suppose the hardware limit for each FEC is 5 next hops and during the course of operation of network device 120, FEC D grows from 5 next hops to 10 next hops. In contrast with the example of FIG. 3A, FEC D is a child FEC (e.g., child node in the graph). To accommodate the 10 next hops, FEC D may be replaced with an HFEC. HFEC 420A may include FEC C, FEC D', FEC $D_1$, and FEC $D_2$. FEC D', FEC $D_1$, and FEC $D_2$ replace FEC D. FEC D' refers to FEC $D_1$ and FEC $D_2$. Each of FEC D', FEC $D_1$, and FEC $D_2$ holds 5 next hops. Alternatively, FEC D may be updated to refer to FEC $D_1$ and FEC $D_2$. The number of next hops is within the hardware limit of 5. Although 5 is used as an example hardware limit and 10 is used as an example number of next hops, different numbers may be used.

FIG. 4B illustrates simplified HFECs 410B and 420B, according to some embodiments. FEC X in HFECs 410B and 420B may be a root node at the top of the tree, hierarchy, or graph. HFEC 410B may include FEC X, FEC Y, and FEC $Z_1$ through FEC $Z_{10}$. Suppose the hardware limit for each FEC is 5 next hops (or lower-level FECs) and FEC Y has 10 next hops. In contrast with the examples of FIGS. 3A and 4A, FEC Y has child FECs (e.g., child nodes in the graph). To accommodate the 10 next hops, FEC Y may be replaced with FEC Y', FEC $Y_1$, and FEC $Y_2$. FEC Y' refers to FEC $Y_1$ and FEC $Y_2$. Alternatively, FEC Y may be updated to refer to FEC $Y_1$ and FEC $Y_2$. Each of FEC $Y_1$ and FEC $Y_2$ refers to 5 lower-level FECs. FEC $Y_1$ refers to FEC $Z_1$ through $Z_5$ and FEC $Y_2$ refers to FEC $Z_6$ through FEC $Z_{10}$. The number of lower-level FECs and next hops is within the hardware limit. The hardware limit of 5 and 10 next hops are presented by way of example and not limitation, and any number may be used for these quantities.

Although FECs and HFECs are described in the foregoing and following illustrative examples, it will be appreciated that the present disclosure is not specific to FECs and HFECs, and is applicable to other data structures.

Next Hop Distribution

As described above, when a FEC is expanded into an HFEC, a new level of FECs may be created below the original unexpanded FEC, such as FEC $B_1$ through FEC $B_x$ (FIG. 3B), FEC $D_1$ and FEC $D_2$ (FIG. 4A), and FEC $Y_1$ and FEC $Y_2$ (FIG. 4B). Next hops may be assigned to (distributed among) the new FECs. The original set of next hops— which may exceed the hardware limit—may be referred to as a group. The (smaller) set of next hops in the FECs in the new level may be referred to as a sub-group.

Figure 5:
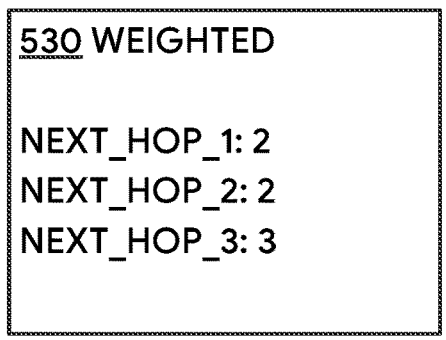
FIG. 5 illustrates example next hop distributions, in accordance with some embodiments of the disclosure.
Figure 5:
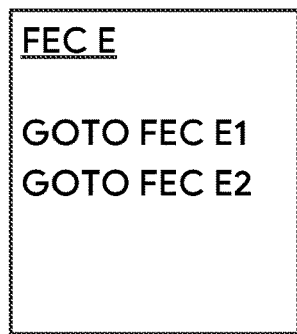
Figure 5:
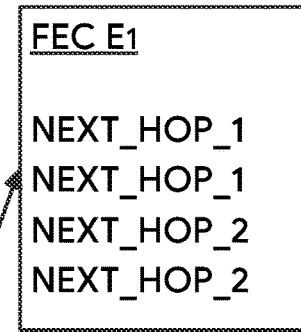
Figure 5:
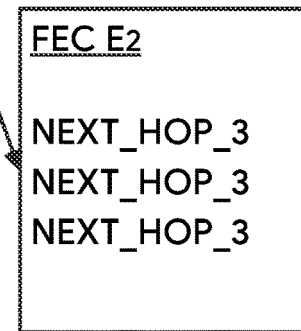
Figure 5:
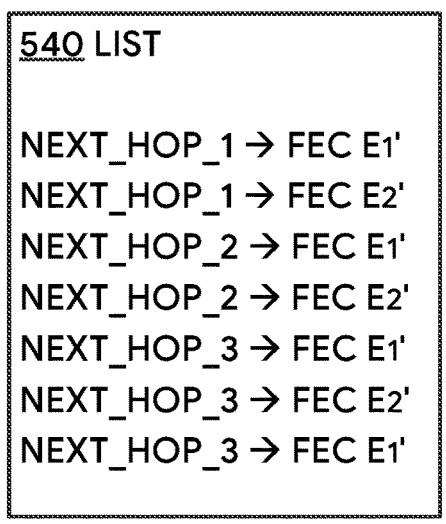
Figure 5:
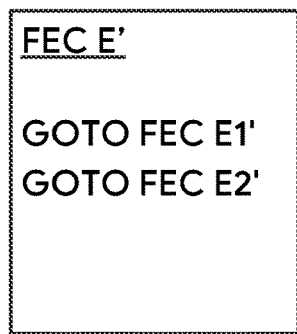
Figure 5:
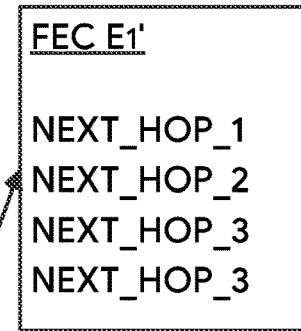
Figure 5:
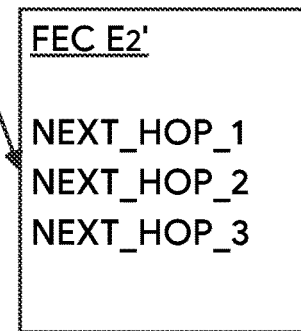

If the next hops (or associated paths) are inherently without order or position in relation to each other, they can be spread across the FECs in a variety of ways. In FIG. 5, examples 510 and 520 depict two distributions of weighted next hops, where the hardware limit is 4 next hops. FEC E and FEC E' may be root nodes at the top of the tree, hierarchy, or graph. Weighted next hops 530 may be the weighted next hops for a multi-path (e.g., UCMP) route. For example, next_hop_1 may have a weight (or cost) of 2, next_hop_2 2, and next_hop_3 3. Typically, next_hop_1 may be used (e.g., sent packets or network traffic) approximately 2 out of every 7 times (~29% of the time), next_hop_2 2 out of every 7 times (~29% of the time), and next_hop_3 3 out of every 7 times (~42% of the time). By way of example and not limitation, weighting may be realized in packet processor 142 by having multiple instances of a next hop in a FEC.

In example 510, FEC $E_1$ holds next hops next_hop_1, next_hop_1, next_hop_2, and next_hop_2, which are a sub-group. FEC $E_2$ holds next hops next_hop_3, next_hop_3, and next_hop_3, which are another sub-group. In the event that next_hop_1 become unavailable (e.g., the path associated with next_hop_1 goes down), next_hop_2 would be used about half the time and next_hop_3 the other half of the time—which is substantially different from the original distribution of ~29% and ~42%, respectively. Downstream network devices in the path associated with next_hop_2 may become overutilized.

Another distribution is shown in example 520. Here, FEC $E_1$' holds next hops next_hop_1, next_hop_2, next_hop_3, and next_hop_3, which are a sub-group. FEC $E_2$' holds next hops next_hop_1, next_hop_2, and next_hop_3, which are another sub-group. This distribution may be advantageous when FECs are written to hardware forwarding table 146 sequentially, and thus minimizing a concentration of each path in a single FEC and minimizing the amount of temporary traffic distribution variance if the new level of FECs are updated in-place. Should next_hop_1 become unavailable, next_hop_2 would be used ~42% of the time and next_hop_3 ~58% of time—which is closer to the original distribution than example 510. Examples 510 and 520 are simplified examples. Larger numbers of next hops may result in next hop traffic distributions closer to the original distribution when a link goes down, depending on the network topology.

By way of non-limiting example, the distribution shown for example 520 may be produced by making a list of next hops, such as list 540. In the list, each next hop is repeated based on the weight (or cost) of the path that the next hop is a part of. Going through the list (similar to round-robin arbitration/scheduling), the next hops may be equally distributed among the FECs. Here, the next hops may be alternately assigned to the two FECs.

If the next hops may be strictly positioned within the FEC structure (e.g., to maintain flow hashing consistency), next hops may be spread in a deterministic manner based on the original position specified. In other words, it may be desirable to preserve the original next hop order. For example, next hops in the order listed in FEC A (FIG. 3A) may be distributed as shown among FEC $B_1$, FEC $B_2$, ..., FEC $B_x$ (FIG. 3B). This distribution may be advantageous, for example, for flow resilience. This distribution may alternatively or additionally be advantageous for Non Stop Forwarding (NSF). When control plane 130 restarts, for example, the next hop distribution (e.g., order of the sub-groups (e.g., order of FEC $B_1$, FEC $B_2$, ..., FEC $B_x$ in FEC A') and order of the next hops in each sub-group) may be recreated in the same order as it is programmed in hardware forwarding table 146.

The next hop distributions described above may be applied to any number of FECs. As described below, the number of sub-groups—which may be the number of FECs in the lower level of hierarchy—may be based on the number of next hops in the group, the hardware limit, a fill proportion, and the like.

FEC Expansion Workflows

Figure 6A:
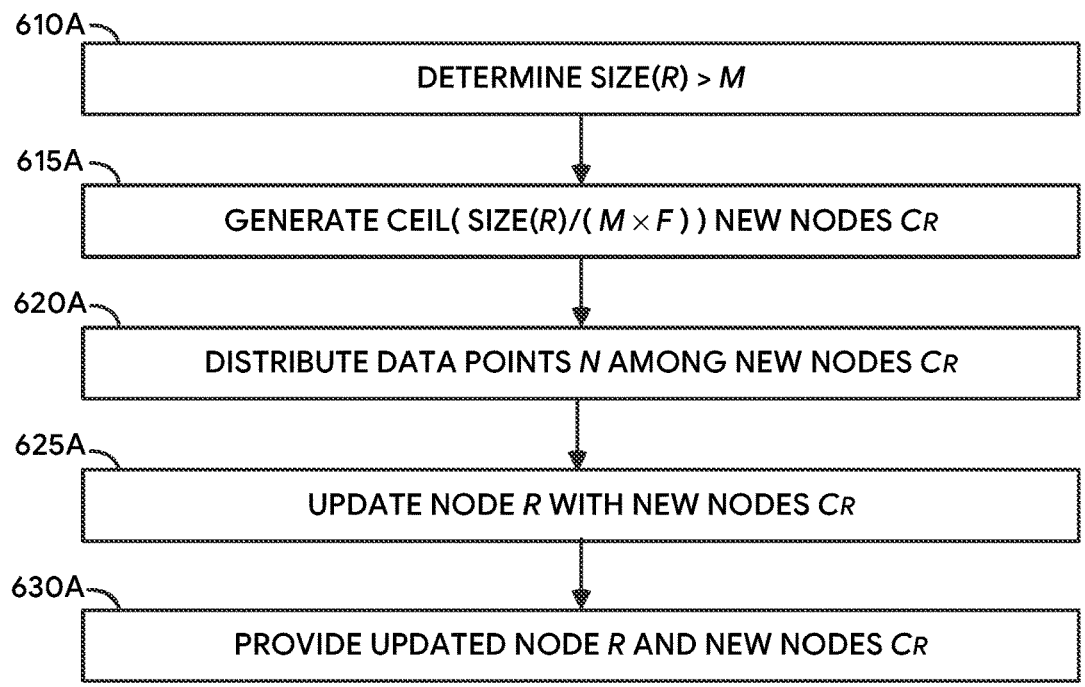
FIG. 6A illustrates a flow diagram of a workflow for increasing a logical multi-path size, in accordance with some embodiments.

FIG. 6A shows workflow 600A for increasing a logical multi-path size, according to various embodiments. Before workflow 600A is applied to a FEC, the FEC may be unexpanded (e.g., FEC A in FIG. 3A). Workflow 400 may be performed by a network device (e.g., CPU 132 (in network device 120) running operating system and/or software 138). Description of workflow 600A will be made with reference to FIGS. 1A, 3A, and 3B. The flow of operations performed by the network device is not necessarily limited to the order of operations shown. Here, the graph may only contain root node R. In other words, initially the FEC is unexpanded (not hierarchical), such as FEC A in FIG. 3A. Each node (FEC) may hold M next hops (e.g., M is the hardware limit).

It may be desirable for the number of next hops assigned to each FEC to be less than M. For example, leaving the capacity to add next hops—not filling a FEC all the way—may be advantageous for accommodating subsequent changes. F is a fill proportion (e.g., fill percentage) which denotes how much a node (e.g., FEC) may be filled with data points (e.g., next hops, lower-level FECs, and the like). F may be, for example, a value between 0 and 1, or 0% and 100%. By way of further non-limiting example, F equal to 0.5 or 50% indicates that a FEC may be filled to half its capacity (e.g., 50%) and F equal to 1 or 100% indicates that a FEC may be filled up to its capacity (e.g., 100%). F may be a predetermined or default value, specified by an administrator/operator of network device 120, and the like.

Workflow 600A may commence at step 610A, where CPU 132 may determine that the number of data points in root node R (e.g., size(R)) is greater than the maximum number of data points the root node R can hold (e.g., M). For example, the number of multi-path next hops in FEC A exceeds the maximum number of entries that FEC A can hold (hardware limit). This may arise because software forwarding table 136 may not have the same storage limitations as hardware forwarding table 146. In other words, M may be a limit imposed by packet processor 142.

At step 615A, CPU 132 may generate new nodes $C_R$. The number of new nodes (FECs) for the new level of hierarchy may be a function of the number of multi-path next hops received. The number of new FECs may be a ceiling function of the number of multi-path next hops received divided by M×F. A ceiling function (e.g., ceil) may return the least integer greater than or equal to the input (e.g., ceil (4.2)=5). For example, FEC $B_1$ through FEC $B_x$ may be produced below FEC A' in the hierarchy as shown in FIG. 3B.

At step 620A, CPU 132 may distribute the data points among the new nodes $C_R$. For example, the multi-path next hops may be distributed among the new FECs as described above in the Next Hop Distribution section. By way of further non-limiting example, FIG. 3B illustrates a distribution of multi-path next hops among FEC $B_1$, FEC $B_2$, ..., FEC $B_x$.

At step 625A, CPU 132 may update root node R to refer to new nodes $C_R$. For example, root node FEC A (FIG. 3A) may be updated as shown to FEC A', which points to FEC $B_1$ through FEC $B_x$ (FIG. 3B).

At step 630A, CPU 132 may provide updated root node R and new nodes $C_R$. For example, CPU 132 running operating system and/or software 138 may program/update hardware forwarding table 146 with FEC A' and FEC $B_1$ through FEC $B_x$.

As noted above, workflow 600A may be initially applied to non-hierarchical FECs. Workflow 600A may also be applied in instances where next hops may be strictly positioned within the HFEC structure, such as for flow resilience. Workflow 600A may calculate the number of FECs based on the number of next hops (and not on a previous state such as described below in workflow 600B). Here, changes to the structure of the graph, tree, or hierarchy can change the flows. For example, if a root node refers to two FECs and then changes to three FECs, the modulo for hashing will be different and all the flows may go through different next hops.

TABLE 1 further describes workflow 600A, according to various embodiments.

TABLE 1

Input:
  Tree G which initially may only contain one root node R. Each
  node in the tree can hold multiple entries. Each entry can either
  be an edge to another node or it can be a data point. initially
  node R holds size(R) data points.
  The maximum number of entries for each node in the tree M.
  The maximum fill percentage for each node F.
Output:
  New tree G for which no node in the tree holds more than M
  entries. The union of all the data points held by the leaf nodes
  in the tree should be equal to the data points initially
  held by node R.
  If size(R) > M:
    Create ceil(size(R)/(M × F)) new nodes $C_R$.
    Distribute the entries of node R among the $C_R$ nodes (preserving
    order between elements if needed).
    Make node R to point to the $C_R$ nodes (add an edge from R
    to each of the $C_R$ nodes).
  Return Node R.

Figure 6B:
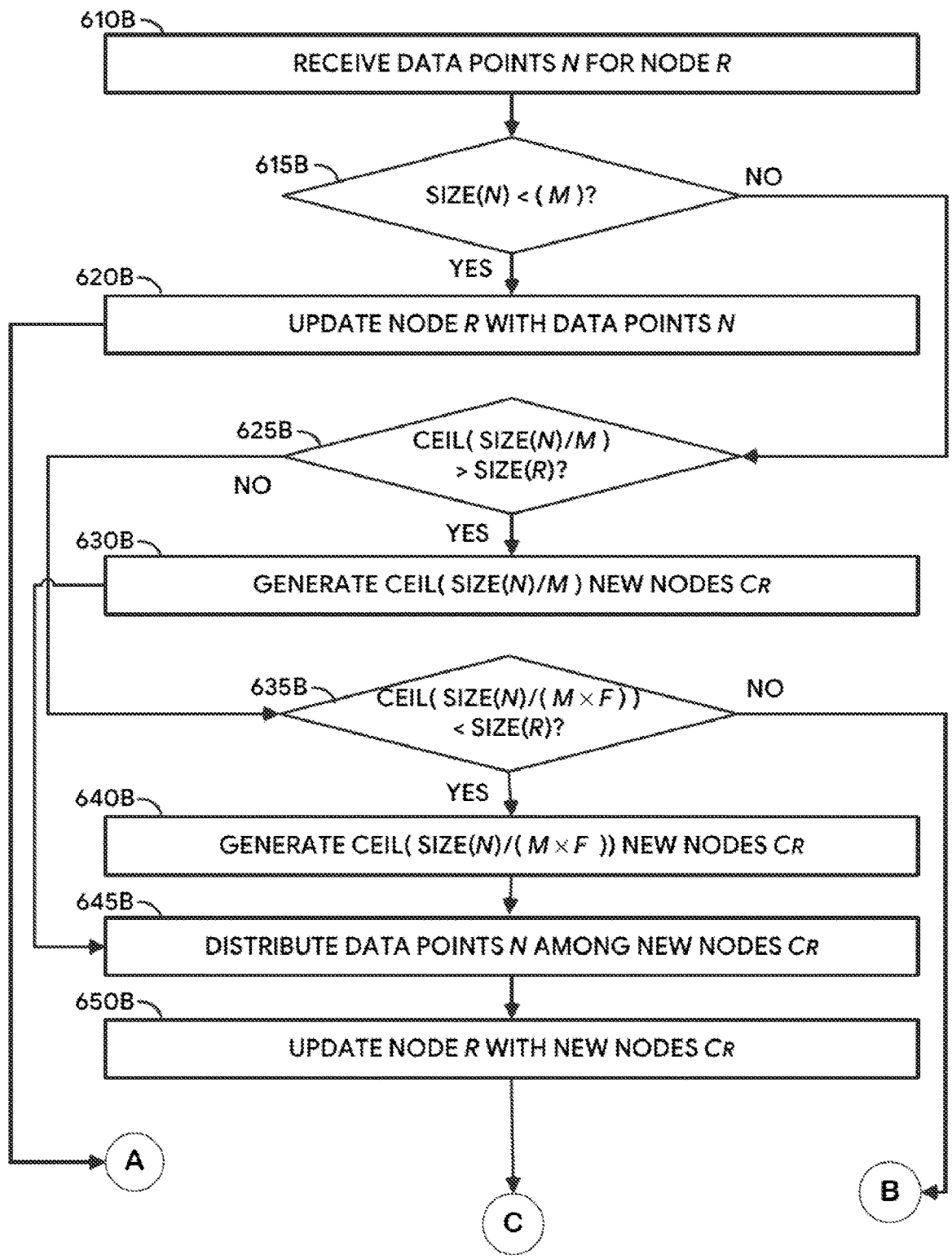
FIGS. 6B and 6C illustrate a flow diagram of a workflow for updating a logical multi-path size, in accordance with some embodiments.
Figure 6C:
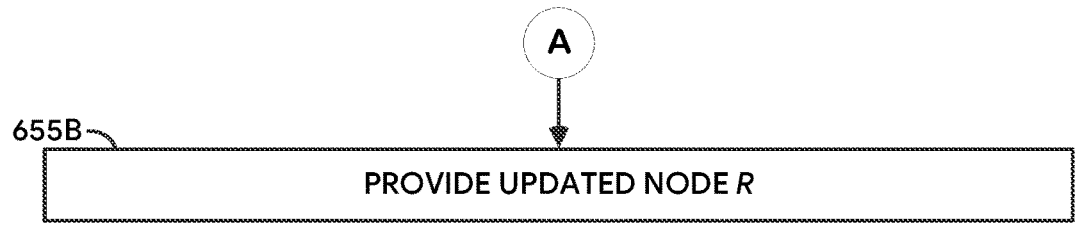
Figure 6C:
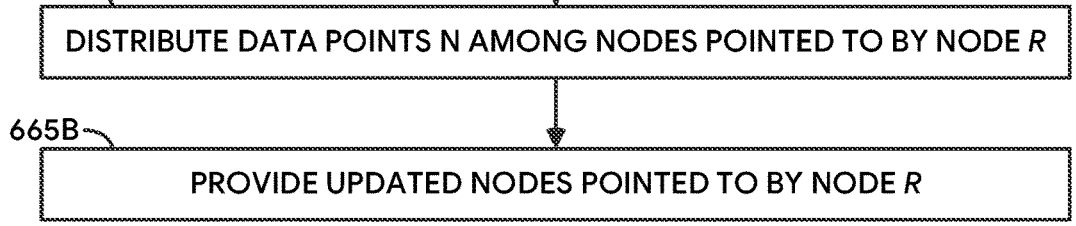
Figure 6C:
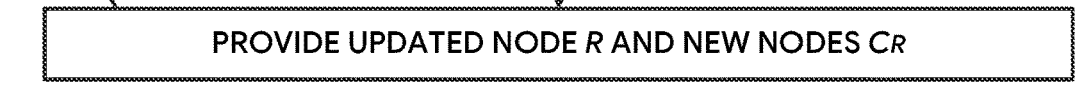

FIGS. 6B and 6C show workflow 600B, which may be used to update a logical multi-path size in some embodiments. Workflow 600B may be performed by a network device (e.g., CPU 132 (in network device 120) running operating system and/or software 138). Description of workflow 600B will be made with reference to FIGS. 1A, 3A, 3B, 4A, and 4B. Although the graph in FIG. 3A is not hierarchical, for the purposes of this description assume FEC A is not a root node (although it could be). The flow of operations performed by the network device is not necessarily limited to the order of operations shown.

Workflow 600B may commence at step 610B, where the network device may receive data points N for node R. For example, CPU 132 may receive multi-path next hops. For example, CPU 132 may receive next hop information from a static configuration for each route, or from advertisements from protocols like Border Gateway Protocol (BGP), and computing which paths to use. Here, the graph may have a topology similar to the example topologies shown in FIGS. 4A and 4B. That is, there may already be HFECs, such as may be produced by workflow 600A. Each node (FEC) may hold M next data points (e.g., M is the hardware limit). F may be a fill proportion which denotes how much a node (e.g., FEC) may be filled with data points (e.g., next hops, lower-level FECs, and the like).

At step 615B, CPU 132 may determine whether the number of data points (e.g., next hops) in N is less than the maximum number of data points (e.g., M or maximum number of next hops). In other words, determine whether there is room in node R for data points N. When there is enough capacity in node R for data points N, workflow 600B may proceed to step 620B. If not, workflow 600B may proceed to step 625B.

At step 620B, CPU 132 may update node R with received data points N. For example, an FEC may be programmed with the received set of next hops. Workflow 600B may proceed to step 655B.

At step 625B, CPU 132 may determine whether a ceiling function of the number of next hops divided by the maximum number of next hops is greater than the number of data points (e.g., next hops) in node R (e.g., ceil(size(N)/M)>size(R)). In other words, when the calculated number of sub-groups (e.g., number of nodes $C_R$) for the current number of paths is greater than the number of sub-groups already in use, then a larger number of sub-groups may be used. When the number of data points in node R is less than a number of prospective new nodes (FECs), then workflow 600B may proceed to step 630B. Otherwise, workflow 600B may proceed to step 635B.

At step 630B, CPU 132 may generate new nodes (e.g., FECs). The number of new FECs may be a ceiling function of the number of data points N (e.g., multi-path next hops) received divided by M (e.g., ceil(size(N)/M)). Workflow 600B may proceed to 645B.

At step 635B, CPU 132 may determine whether a ceiling function of the number of data points N divided by the maximum number of data points multiplied by a fill ratio is less than the number of data points in node R (e.g., ceil(size(N)/(M×F))<size(R)). In other words, when the calculated number of sub-groups (e.g., number of nodes $C_R$) for the current number of paths is lower than the number of sub-groups already in use, then this new smaller number of sub-groups may be used instead to reduce hardware utilization. When the number of data points in node R is greater than a number of prospective new nodes (FECs), then workflow 600B may proceed to step 640B. Otherwise, workflow 600B may proceed to step 660B.

At step 640B, CPU 132 may generate new nodes (e.g., FECs) forming a new level in the hierarchy. The number of new nodes may be a ceiling function of the number of received data points (e.g., multi-path next hops) divided by M adjusted by the fill factor (e.g., ceil(size(N)/(M×F)). Node R may refer to the generated nodes $C_R$. At step 645B, the data points may be distributed among the generated new nodes $C_R$. For example, the multi-path next hops may be distributed among the new FECs as described above in the Next Hop Distribution section.

At step 650B, root node R may be updated with new nodes $C_R$ (e.g., FECs). Workflow 600B may proceed to step 670B.

At step 655B, CPU 132 may provide updated node R (e.g., FEC). For example, CPU 132 running operating system and/or software 138 may program/update hardware forwarding table 146 with updated node R.

At step 660B, CPU 132 may distribute data points N (next hops) to nodes (FECs) referred to by node R (FEC). Instead of generating new nodes, the existing direct child nodes of node R may be reprogrammed with the next hops, producing updated direct child nodes of node R. For example, the multi-path next hops may be distributed among the new FECs as described above in the Next Hop Distribution section.

At step 665B, CPU 132 may provide updated direct child nodes (FECs) of node R (FEC) to packet processor 142. For example, CPU 132 running operating system and/or software 138 may program/update hardware forwarding table 146 with the updated direct child nodes.

At step 670B, CPU 132 may provide updated node R and new nodes $C_R$ to packet processor 142. For example, CPU 132 running operating system and/or software 138 may program/update hardware forwarding table 146 with updated node R and new nodes $C_R$.

TABLE 2 further describes workflow 600B, in accordance with various embodiments.

TABLE 2

Input:
   Tree G which initially may only contain root node R pointing to $C_R$ next level nodes.
   A new collection of data points N.
   The maximum number of entries for each node in the tree M.
   The maximum fill percentage for each node F.
Output:
   New tree G for which no node in the tree may hold more than M entries. The union of all the data points held by the leaf nodes in the tree should be equal to the data points in N.
   If size(N) < (M):
      Replace contents of R with data points in N
   else If ceil(size(N)/M) > size(R):
      Create ceil(size(N)/M) new nodes $C_R$ (some or all may be reused from the previous$C_R$)
      Distribute the data points N among the $C_R$ nodes
      Make node R to point to the $C_R$ nodes
   else If ceil(size(N)/(M × F)) < size(R):
      Create ceil(size(N)/(M × F)) new nodes $C_R$ (some or all may be reused from the previous$C_R$)
      Distribute the data points N among the $C_R$ nodes
      Make node R to point to the $C_R$ nodes
   else:
      Distribute the data points N among the nodes currently pointed by R.
   Return Node R.

Network Device

FIG. 7 depicts an example of a network device 700 in accordance with some embodiments of the present disclosure. In some embodiments, network device 700 can be a switch. As shown, network device 700 includes a management module 702, an internal fabric module 704, and a number of I/O modules 706a-706p. Management module 702 includes the control plane (also referred to as control layer or simply the CPU) of network device 700 and can include one or more management CPUs 708 for managing and controlling operation of network device 700 in accordance with the present disclosure. Each management CPU 708 can be a general-purpose processor, such as an Intel®/AMD® x86 or ARM® microprocessor, that operates under the control of software stored in a memory, such as random access memory (RAM) 726. Control plane refers to all the functions and processes that determine which path to use, such as routing protocols, spanning tree, and the like.

Internal fabric module 704 and I/O modules 706a-706p collectively represent the data plane of network device 700 (also referred to as data layer, forwarding plane, etc.). Internal fabric module 704 is configured to interconnect the various other modules of network device 700. Each I/O module 706a-706p includes one or more input/output ports 710a-710p that are used by network device 700 to send and receive network packets. Input/output ports 710a-710p are also known as ingress/egress ports. Each I/O module 706a-706p can also include a packet processor 712a-712p. Each packet processor 712a-712p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 702 includes one or more management CPUs 708 that communicate with storage subsystem 720 via bus subsystem 730. Other subsystems, such as a network interface subsystem (not shown in FIG. 7), may be on bus subsystem 730. Storage subsystem 720 includes memory subsystem 722 and file/disk storage subsystem 728 represent non-transitory computer-readable storage media that can store program code and/or data, which when executed by one or more management CPUs 708, can cause one or more management CPUs 708 to perform operations in accordance with embodiments of the present disclosure.

Memory subsystem 722 includes a number of memories including main RAM 726 for storage of instructions and data during program execution and read-only memory (ROM) 724 in which fixed instructions are stored. File storage subsystem 728 can provide persistent (i.e., non-volatile) storage for program and data files, and can include a magnetic or solid-state hard disk drive, and/or other types of storage media known in the art.

One or more management CPUs 708 can run a network operating system stored in storage subsystem 720. A network operating system is a specialized operating system for network device 700 (e.g., a router, switch, firewall, and the like). For example, the network operating system may be Arista Extensible Operating System (EOS), which is a fully programmable and highly modular, Linux-based network operating system. Other network operating systems may be used.

Bus subsystem 730 can provide a mechanism for letting the various components and subsystems of management module 702 communicate with each other as intended. Although bus subsystem 730 is shown schematically as a single bus, alternative embodiments of the bus subsystem can utilize multiple busses.

What is claimed is:

1. A method for increasing a multi-path size using hierarchical forwarding equivalent classes (HFECs) in a network device comprising:
   receiving a plurality of data points representing a set of next-hops for a multi-path route;
   wherein when a number of the plurality of data points is less than a maximum node capacity:
      updating a first node with the plurality of data points; and
      programming a hardware table in a packet processor with the updated first node; and
   wherein when a ceiling function of the number of the plurality of data points divided by the maximum node capacity is greater than the number of plurality of data points in the first node:
      generating at least one second node, a number of the at least one second node generated being the ceiling function of the number of the plurality of data points divided by the maximum node capacity;

updating the first node to refer to the at least one second node in a hierarchy model;
distributing the data points among the at least one second node; and
programming the hardware table with the updated first node and the at least one second node,
wherein at least one of the first node and the second nodes are forwarding equivalence classes.

2. The method of claim 1 further comprising:
wherein when the ceiling function of the number of the plurality of data points divided by a node capacity is less than the number of the plurality of data points in the first node:
generating at least one third node, a number of the at least one third node generated being the ceiling function of the number of the plurality of data points divided by the node capacity;
updating the first node to refer to the at least one third node;
distributing the plurality of data points among the at least one third node; and
programming the hardware table with the updated first node and the at least one third node.

3. The method of claim 2 wherein the node capacity is the maximum node capacity multiplied by a fill proportion.

4. The method of claim 2 further comprising:
wherein when the ceiling function of the number of the plurality of data points divided by the node capacity is greater than or equal to the number of plurality of data points in the first node:
allocating the plurality of data points to at least one fourth node, the at least one fourth node being referred to by the first node;
updating the at least one fourth node with the allocated data points; and
programming the hardware table with the at least one updated fourth node.

5. The method of claim 1, wherein the first node is a root node and the at least one second node is a leaf node in the hierarchy model.

6. The method of claim 1 wherein distributing the plurality of data points comprises:
duplicating the plurality of data points in the at least one second node based on a respective weight associated with each data point of the plurality of data points.

7. A network device comprising:
a processor; and
a memory communicatively coupled to the processor, the processor storing instructions executable by the memory to perform a method for increasing a multi-path size using hierarchical forwarding equivalent classes (HFECs), the method comprising:
receiving a number of data points representing a set of next-hops for a multi-path route;
determining that the number of data points in a first node is greater than a maximum node capacity;
generating at least one second node;
updating the first node to refer to the at least one second node in a hierarchy model;
distributing the data points among the at least one second node; and
programming a hardware forwarding table with the updated first node and the at least one second node,
wherein at least one of the first node and the second nodes are forwarding equivalence classes.

8. The network device of claim 7 wherein the distributing the data points preserves an original next hop order.

9. The network device of claim 7 wherein the number of second nodes is a ceiling function of the number of the data points in the first node divided by a node capacity.

10. The network device of claim 9 wherein the node capacity is the maximum node capacity multiplied by a fill proportion.

11. The network device of claim 7, wherein the first node is a root node and the at least one second node is a leaf node in the hierarchy model.

12. The network device of claim 7 wherein a received data packet is forwarded to a next hop of the set of next-hops using the hardware forwarding table.

13. A non-transitory computer-readable storage medium having embodied thereon a program, the program being executable by a processor to perform a method for increasing a multi-path size using hierarchical forwarding equivalent classes (HFECs), the method comprising:
receiving a multi-path route having a plurality of next hops for a plurality of paths;
determining if the number of next hops in the plurality of next hops is greater than a limit;
when the number of next hops is greater than the limit, calculating a number of sub-groups;
distributing the plurality of next hops among the sub-groups;
generating forwarding equivalence classes (FECs) for the sub-groups, the FECs including the next hops of the sub-group; and
programming a hardware forwarding table with the generated FECs.

14. The storage medium of claim 13 wherein calculating the number of sub-groups is based on at least one of the number of next hops, the limit, and a maximum fill percentage.

15. The storage medium of claim 13 further comprising decreasing the number of sub-groups.

16. The storage medium of claim 13 further comprising increasing the number of sub-groups.

17. The storage medium of claim 13 wherein the plurality of paths is equally distributed among the sub-groups.

18. The storage medium of claim 13 wherein at least some of the plurality of paths is included in more than one sub-group of the sub-groups.

19. The storage medium of claim 13 further comprising updating a second FEC with the generated FECs.

20. The storage medium of claim 13, wherein the generated FECs are nodes in a hierarchy model.

* * * * *